United States Patent [19]

Takagi

[11] 4,206,096

[45] Jun. 3, 1980

[54] POLYOLEFIN COMPOSITION, A MOLDING THEREOF AND A PROCESS FOR PRODUCING THOSE

[75] Inventor: Kaneyuki Takagi, Tokyo, Japan

[73] Assignees: Mitsui Toatsu Chemicals Inc.; Daiwa Corporation, Ltd., both of Tokyo, Japan

[21] Appl. No.: 929,049

[22] Filed: Jul. 28, 1978

Related U.S. Application Data

[63] Continuation of Ser. No. 707,397, Jul. 21, 1976, abandoned.

[30] Foreign Application Priority Data

Jul. 11, 1975 [JP] Japan .................................. 50-89363
Jul. 11, 1975 [JP] Japan .................................. 50-89371

[51] Int. Cl.$^2$ ............................................. C08L 23/06
[52] U.S. Cl. ................................. 260/18 N; 525/125; 525/179; 525/208; 525/218; 525/221; 525/222; 525/236

[58] Field of Search .......... 260/845, 846, 848, 857 D, 260/857 L, 859 R, 876 B, 888, 889, 18 N

[56] References Cited

U.S. PATENT DOCUMENTS

| | | | |
|---|---|---|---|
| 3,546,319 | 12/1970 | Prevorsek | 260/857 D |
| 3,781,234 | 12/1973 | Drawert | 260/18 N |
| 3,864,432 | 2/1975 | Adler | 260/889 |

*Primary Examiner*—Paul R. Michl
*Attorney, Agent, or Firm*—Sughrue, Rothwell, Mion, Zinn and Macpeak

[57] ABSTRACT

A reactive polyolefin composition comprising a polyolefin and a rubber component dispersed in the polyolefin in fine granular form, at least a portion of the particles of the rubber component containing at least one type of polymer having a functional group in the molecular structure thereof, a molding thereof and a process for producing the same, are disclosed.

10 Claims, No Drawings

POLYOLEFIN COMPOSITION, A MOLDING THEREOF AND A PROCESS FOR PRODUCING THOSE

This is a continuation of application Ser. No. 707,397, filed July 21, 1976 now abandoned.

BACKGROUND OF THE INVENTION

1. Field of the Invention

The present invention relates to a reactive polyolefin composition where a functional group is introduced into a chemically inert polyolefin, a molding thereof and a process for producing the same. More particularly, the present invention relates to a polyolefin molding which is capable of easy secondary processing such as coating, printing or the like, and a process for producing such a molding.

2. Description of the Prior Art

Heretofore, since polyolefins have no polar group nor active group showing reactivity in their molecular structure, and are poor in a solubility in solvents, it has been difficult to secondary process the same, such as bond, print, coat, dye or the like a surface of a molding thereof. As a result, various special surface treatments have been employed to apply secondary processings as mentioned above to the surface of a polyolefin molding.

In printing, a flame-treatment, a corona discharge treatment or the like is generally employed; but these techniques involve the disadvantages that the shape of the moldings processable is restricted, and the surface activity obtained is not sufficient. Further, they involve the defect that the type of ink used is restricted. Therefore, the moldings thus treated cannot be coated from the standpoint of practical use.

In bonding, a technique is known where the surface of a molding is oxidized with a chromium acid-sulfuric acid mixed solution; however, in this known method there are disadvantages such that dangerous chemicals are used, operations are complicated and the treated surface loses luster. Further, local oxidation is difficult. Therefore, the molding thus treated cannot be coated from the standpoint of practical use.

In coating, there are paints for polyolefins which do not require the surface treatments mentioned above for use. There are two types of such paints, one where a resinous undercoating primer is necessary and another where a single coating of paint can be used which does not require the use of a primer. However, there are difficulties in that since the primer is expensive, the paint which requires the use of a primer involves high material costs and high coating costs, and since the latter paint (not requiring the use of primer) is a specific paint, the properties of the paint film are restricted.

In addition, in order to impart activity to a polyolefin other techniques have been attempted: the copolymerization of an olefin with a comonomer having a functional group, such as vinyl acetate, or acrylic acid; the hydrolysis of a copolymer of an olefin and vinyl acetate; or the graft polymerization of an olefin with acrylic acid or acrylic anhydride, etc. However, the functional group introduced does not show activity under normal conditions and only shows activity upon melting for bonding to a metal, glass fiber or the like. Therefore, a molding of such modified polyolefins cannot be coated with general paints, and, in many cases, the physical properties of the modified material are remarkably different from the inherent physical properties of the original resin.

SUMMARY OF THE INVENTION

One object of the present invention is to provide a reactive polyolefin composition, a molding thereof and a process for producing the same.

Another object of the present invention is to provide a polyolefin composition which is easily subjected to secondary processing.

The polyolefin composition according to the present invention is one wherein at least a portion of the rubber component particles which are dispersed in the polyolefin contain at least one type of polymer having a functional group in the molecular structure thereof, wherein the polymer has compatibility with the rubber component and the rubber component is incompatible with the polyolefin.

The polyolefin composition according to the present invention is obtained by molding a polyolefin in which such a rubber component is dispersed in the form of fine particles and coating the resulting molding with a solution prepared by dissolving at least one type of polymer having a functional group into a common solvent for the rubber component.

Further, the polyolefin composition of the present invention can be obtained by blending the rubber component and the polymer with the polyolefin and then melt kneading the resulting blend.

DETAILED DESCRIPTION OF THE INVENTION

The polyolefins useful in the present invention include any polyolefin which can be molded, but are generally homopolymers or copolymers of unsaturated hydrocarbons having 2 to 6 carbon atoms such as ethylene, propylene, butene, methylpentene or the like, or mixtures of those polymers. Examples of the polyolefins include polyethylene, polypropylene, polymethylpentene, a propylene-ethylene copolymer containing about 1.5 to about 20 wt% ethylene, an ethylene-propylene copolymer containing about 0.5 to about 2 wt% propylene, an ethylene-butene copolymer containing about 0.5 to about 2 wt% butene, a mixture of polypropylene (any percentage is acceptable so long as the system is miscible) and at least one of the above-mentioned copolymers, or the like.

The degree of polymerization, the proportion of each comonomer in the copolymer and the proportion of each polymer in a mixture may be optionally selected if molding is possible. The degree of polymerization is generally about 1,000 to about 5,000, though such can vary depending upon the kind of resin. The melt index is preferably about 0.1 to about 20, from the standpoint of molding capability.

The rubber component used in the present invention is a thermoplastic uncured elastomer which is incompatible with the polyolefin and which is soluble in a solvent or a mixed solvent. For example, there are rubber components which are soluble in aromatic solvents such as toluene, xylene or the like; ketones such as methylethyhl ketone, methylisobutyl ketone or the like; aliphatic acid esters such as ethyl acetate, butyl acetate, amyl acetate or the like; alcohols such as isopropyl alcohol, isobutyl alcohol or the like; or mixtures thereof. Examples of the rubber component include 1,4-polybutadiene, 1,2-polybutadiene, styrene-butadiene rubbers, an acryl ester rubber (e.g., butyl acrylate rubber) or the like. The molecular weight of the rubber component is not specifically limited, but a melt index (under a load of 2.16 kg at a temperature of 150° C.) of from about 1 to about 5 is preferable since dispersion thereof is easy.

The polymer having a functional group may be obtained by any polymerization technique such as addition polymerization, condensation polymerization, addition condensation polymerization or the like. Examples of the functional group include a hydroxy group, carboxyl group, glycidyl group, amino group, amide group, imino group, isocyanate group or the like.

Examples of such polymers usable in the present invention include a partially saponified product of ethylene-vinyl acetate copolymer (the saponification percentage is within a range such that the product is soluble in a solvent), an acrylic acid polymer, polyacrylamide, N-methylol polyacrylamide, a condensation product of a dimer acid such as a dimer of linolic acid and a diamine such as ethylene diamine, 1,2-polybutadiene modified to have a functional group as mentioned above at the terminals, the N-methoxymethyl ether of 6-Nylon, an urethane prepolymer or the like. The polymers may be used as mixtures of two or more thereof if they are not mutually reactive. The polymer is soluble in a solvent as earlier described for the rubber component and useful commercially available products generally having a molecular weight of about 1,000 to about 50,000 can be used directly. It can generally be said that the polymer containing a functional group must exhibit good heat stability to prevent decomposition from occurring during processing.

It is most preferred in accordance with the present invention that the proportion of functional groups in the composition prepared by blending the polymer having the functional group with a rubber component and dispersing a solution thereof into the polyolefin composition be at least about 1/100 mol per 100 parts by weight of the rubber component.

In the case of treating the surface of a polyolefin molding containing a rubber component in the form of fine particles with a solution of the polymer having a functional group, the proportion of the polymer having a functional group to the rubber component particles exposed at the time the surface of the polyolefin is removed is the same as that above, i.e., at least 1/100 mol per 100 parts by weight of the rubber component.

In order to disperse the rubber component into the polyolefin, it is beneficial to add the rubber component to the polyolefin and melt-knead the resulting blend. It is more preferred if the rubber component is finely dispersed in the polyolefin, and for this purpose it is desirable to use a Banbury mixer or a biaxial extruder having strong kneading effect. Blending of the rubber component is carried out by directly supplying the resin and the rubber component into the above mentioned kneader in a feeding ratio equal to the blend ratio by a quantitative feeder or by pre-mixing using another blender.

The amount of the rubber component used in the present invention is optional if one desires only to impart reactivity to the polyolefin, but in order to obtain a remarkable effect, it is preferred to blend the rubber component in an amount of at least about 3% by weight, preferably about 5 to about 15% by weight, based on the weight of the polyolefin composition. In the case that the inherent physical properties, specifically a deterioration of rigidity and a lowering of the heat distortion temperature, cost or the like need not be considered, an amount of more than about 15% by weight can be blended.

The particle size of the rubber component particles is better when it is smaller, and a particle size of not larger than about $5\mu$, preferably not larger than about $1\mu$ is preferred. That is, in the case of using a constant amount of the rubber component, it is preferred to finely disperse the same so as to increase the number of the rubber component particles present per unit area of the surface of the polyolefin composition molding.

A stabilizer such as a UV absorbant, an anti-oxidizing agent, an anti-static agent or the like; an inorganic or organic filler such as calcium carbonate to improve the rigidity of molding; or a pigment for coloring the same, as are conventionally used for polyolefin moldings, can be blended in the polyolefin composition in a conventional manner, if desired.

The polyolefin composition is molded by injection molding, blow molding, extrusion molding or the like. The rubber component particles dispersed in the polyolefin are not exposed in any substantial fashion on the surface of the molding since, in general, polyolefins have good fluidaity upon melting and form a thin layer on the surface of the molding. In the case of coating a polymer solution, in order to obtain a sufficient effect of the present invention, it is necessary to remove the surface layer comprising the polyolefin to thereby expose the fine particles of the rubber component. The surface layer can be removed by mechanically breaking the surface layer using abrasive paper, by sand blasting, buff, or the like, or by dissolving the surface layer using a solvent such as toluene, xylene, trichlene, trichloroethane or the like. The removal need only be sufficient to expose portions in which the fine rubber component particles are uniformly dispersed. Then, a solution prepared by dissolving the polymer having the described functional group into a common solvent for the polymer and the rubber component contained in the polyolefin composition is applied to the surface of the polyolefin composition molding and then dried. Since the polymer in the solution is dissolved in the solvent common to the rubber component exposed on the surface, it is dissolved in the rubber component, thereby increasing the peeling resistance of the polymer layer by an anchoring effect.

As the solvent, any solvent can be optionally selected, such as toluene as mentioned above, but if a solvent having too low a boiling point is used, the solvent evaporates before the polymer sufficiently dissolves therein. Therefore, it is generally preferred to use a solvent having a boiling point of not lower than about 80° C. The concentration of the polymer in the solution can be optionally determined, but a concentration of from about 1 to about 30% by weight is generally used. However, the normal rule is that a concentration of the polymer in the solution is preferably about 1 to about 3% by weight is preferred, these percentages being based on the total weight of the solution. If the concentration is too low, the effect of the present invention becomes small, while if the concentration exceeds about 5% by weight, the polymer layer becomes thick, whereby in some cases appearance is impaired when secondary processing such as a coating is used.

In general, a polymer solution having such a concentration has a low viscosity, and, as a result, can be coated in any optional manner such as brush coating, immersion or the like.

In the case that the solvent can dissolve the polyolefin, it is possible to dissolve the polymer into the rubber component without conducting the above-mentioned removal treatment. It is, however, more effective to previously remove the surface layer.

The application amount of the polymer solution can be optionally determined, but if the amount of the polymer solution dissolving in the rubber component is too small, the effect of the present invention becomes small, and, therefore, it must be coated in an amount sufficient to give the reactivity that the polyolefin composition molding requires. For example, in the case that the polyolefin composition molding of the present invention is coated, extremely excellent results are obtained when coating with a 2 wt% solution in an amount such that the dry thickness becomes $0.3\mu$. It is usually sufficient for coating solutions in general to use a dry thickness of not larger than about $1\mu$.

After coating, the polyolefin composition molding is dried. The drying manner is optional, but air drying at normal temperature is generally employed. The drying time is generally about 10 to about 15 minutes.

The polyolefin composition of the present invention can be also obtained in the following manner.

The rubber component and at least one type of polymer having a functional group are blended with the polyolefin and melt kneaded to obtain a composition wherein the rubber component particles containing the polymer are dispersed in the polyolefin. The composition thus obtained is molded in a manner as mentioned before. The surface layer of the molding is composed of the polyolefin, and in order to sufficiently expose the fine particles of the rubber component containing the polymer, it is necessary to remove the polyolefin which forms the surface layer by the treatment mentioned before.

The amount of the rubber component in the composition is preferably at least about 3% by weight, more preferably about 5 to about 15% by weight, based on the weight of the polyolefin composition, for the same reasons as mentioned before. The amount of the polymer having a functional group can be optionally selected depending upon the reactivity to be imparted, but in order to obtain a sufficient effect of the present invention, an amount of from about 1 to about 10% by weight based on the weight of the polyolefin composition is preferred. A polymer which is unstable to heat and is apt to cure or decompose (even if it has a functional group) cannot be used in this method.

A stabilizer, a pigment, a filler or the like as mentioned before can be similarly added to the above composition.

The effect of the present invention is exhibited more remarkably by employing the above-mentioned two production processes in combination, for example, see Example 11.

The surface of the polyolefin composition molding obtained by any process shows a reactivity corresponding to the functional group which the polymer used has. That is, since the surface described above reacts with a resin having a group reactive with the functional group thereof, it is possible to react the same with a composition containing such a resin for secondary processing of the polyolefin molding, such as a paint, an adhesive, a dyestuff or the like. For example, since a molding comprising a composition containing a hydroxy group, amino group, amide group or the like reacts with isocyanates, it shows good adhesiveness to an urethane paint. Further, in the case of using a polymer having an epoxy group, such shows good adhesiveness to an urethane paint, a phenol paint and an alkyd paint, and in the case of using a polymer having an amide group or an N-methylol group, such shows good adhesiveness to a melamine paint. The coating of such paints can be conducted in a conventional manner.

In the case of a general polyolefin molding, even though a polymer having a functional group is coated on the surface thereof and a paint which is reactive with the polymer coated is coated thereon, the paint film does not adhere to the molding, while in the case of a molding of the present invention in which the rubber component is dispersed, the coating film adheres tightly to the molding. The following are considered as the reasons therefor. The reason one cannot form a tightly adhered paint film even though a polymer having a functional group is coated in the case of a general polyolefin molding is that the polymer having a functional group has no compatibility with the polyolefin and does not adhere to the polyolefin. As a result, peeling occurs at the interface between the polyolefin and the polymer having functional group. On the other hand, in the case of a molding in which the rubber component is dispersed, since the polymer having a functional group is dissolved in a solvent common to the rubber component, the polymer is dissolved into the rubber component particles, and, therefore, the paint reacts with the polymer contained in the rubber particles and tightly adheres to the polyolefin via the rubber particles which act as anchors, thereby increasing the resistance to peeling. As a result of observing a polypropylene composition (obtained using 10 wt% of the rubber component and melt kneading in a continuous Banbury mixer) with an electron microscope, it was confirmed that about 5,000,000 rubber component particles were present per 1 $mm^2$.

In addition, the polyolefin composition molding obtained according to the process of the present invention not only has a modified surface but also improved impact resistance due to the fine dispersion of the rubber component particles, while rigidity and heat distortion resistance are deteriorated slightly. In the case of improving the impact strength of the polyolefin by the rubber component, the rubber component is generally added in an amount of from about 1 to about 30% by weight based on the total weight of the polyolefin(s) present. In the present invention, since the rubber component is generally added in an amount of from about 5 to about 15% by weight, there is no practical problem with respect to physical properties and there is provided the advantage that the impact strength is rather improved. In other words, according to the process of the present invention, secondary processing such as coating which has heretofore been considered difficult can be freely carried out, and, also, physical properties can be improved from the practical standpoint. Thus, the industrial value of the present invention is high.

The following Examples are given to further illustrate the present invention in detail but the invention is not to be construed as being limited thereby. In the Examples, the cross cut test was conducted according to the criteria of JIS D-0202 (1971) 8.12 and was conducted in the manner that eleven longitudinal and horizontal cutting traces were provided on the surface (paint film) of the test piece at a distance of 1 mm on an area of 10 $mm^2$, and an adhesive tape having a width of 12 mm was adhered thereto and rapidly peeled in a direction at a right angle to the test piece to observe the percentage of the paint film unpeeled.

EXAMPLE 1

90 kg of polypropylene homopolymer (having a melt flow index 12) and 10 kg of 1,2-butadiene rubber (trade name "BR 810", manufactured by the Japanese Synthetic Rubber Co., Ltd.; 1,2-bonds at least 90%; crystallinity 15%; melt flow index 3) were blended and then melt kneaded in a continuous Banbury mixer at about 200° C. The melt discharged from the mixer was formed into a sheet shape, cooled to below 100° C. and crushed to obtain a composition in which the rubber component was finely dispersed (particle size: not larger than about $1\mu$). The composition obtained was formed into a test piece having a size of $160 \times 80 \times 2$ mm by injection molding at about 220° C. After abrading the surface of the test piece obtained with abrasive paper (JIS #400), as a polymer having a functional group, a 2 wt% toluene solution of modified 1,2-polybutadiene (trade name "PB-G 1000", manufactured by Nippon Soda Co., Ltd.: means molecular weight 1,200) having an OH group at the terminals thereof was coated on the surface in an application amount of about $1\mu$ (dry thickness) and dried at room temperature for 15–20 minutes. Thereafter, an urethane paint (trade name "Uniace #70", manufactured by Cashew Co., Ltd.) was coated thereon in an average coating thickness of about $20\mu$. The test piece thus treated was subjected to the cross cut test using a cellophane adhesive tape (trade name "Cellotape", manufactured by Nichiban Co., Ltd.) to observe the peelability of the paint film.

As a result of the test, the paint film did not peel off.

COMPARISON EXAMPLE 1

The same procedure as in Example 1 was repeated except for using no 1,2-butadiene rubber.

As a result of the test, the paint film peeled off completely.

EXAMPLE 2

Three test pieces were prepared and treated in the same manner as in Example 1 except for using, as the rubber component, a styrene-butadiene rubber instead of 1,2-butadiene rubber and, as the polymer having a functional group, a vinyl copolymer containing, as a comonomer, a vinyl monomer having a glycidyl group (trade name "Almatex 2220", manufactured by Mitsui Toatsu Chemicals, Inc.). Each of an urethane paint (trade name "Uniace #70", manufactured by Cashew Co., Ltd.), a phenol paint (trade name "Cashew" manufactured by Cashew Co., Ltd.) and an alkyd paint (trade name "Carrot #3000", manufactured by Cashew Co., Ltd.) was coated on each of the three test pieces in an average coating thickness of about $20\mu$. Each of the test pieces was subjected to the cross cut test.

As a result of the test, none of the paint films peeled off.

EXAMPLE 3

In Example 2, an N-methoxymethylated product of 6-Nylon (viscosity 10 cps (20° C.) in a 5% methanol solution; methoxy-methylation percentage 30%) was used as the polymer having a functional group. A 3% solution thereof (solvent: toluene isopropanol $=70/30$ in weight percent) was coated in a dry coating thickness of about $1\mu$ and dried. Thereafter, each of a melamine paint (trade name "Mela #20", manufactured by Cashew Co., Ltd.) and an urethane paint (trade name "Uniace #70", manufactured by Cashew Co., Ltd.) was coated on two samples in an average coating thickness of about $20\mu$.

None of the paint films peeled off in the cross cut test.

EXAMPLE 4

The same procedure as in Example 2 was repeated except for using a high density polyethylene (melt index 20) instead of polypropylene.

The paint film obtained did not peel off in the cross cut test.

EXAMPLE 5

The same procedure as in Example 3 was repeated except for using acryl ester rubber (trade name "Toaacron F-30", manufactured by Toa Paint Co., Ltd.) instead of the styrenebutadiene rubber.

None of the paint films obtained peeled off in the cross cut test.

EXAMPLE 6

48 kg of polypropylene homopolymer (melt flow index 12), 2 kg of styrene-butadiene rubber as was used in Example 2, 25 kg of cellulocin (wood flours, 120 mesh sieve pass) and 25 kg of calcium carbonate (particle size: $3-5\mu$; hereafter the same, unless otherwise indicated) were weighed and the first two materials were mixed in a tumbler. The resulting mixture, the cellulocin and the calcium carbonate were supplied to a Banbury mixer by means of a quantitative feeder at a feeding ratio of 2:1:1 in weight ratio and melt kneaded at about 200° C. The melt discharged from the mixer was cooled and crushed to obtain a composition.

The composition obtained was molded by injection molding to prepare a test piece having a size of $160 \times 80 \times 2$ mm. The surface of the test piece was then abraded with abrasive paper (JIS #400). After coating the surface with a 2% toluene solution of a partially saponified product of ethylene-vinyl acetate copolymer (trade name "Dumilan D251", manufactured by Mitsui Polychemical Co.) in a dry film thickness of about $1\mu$ and drying at natural conditions at room temperature, an urethane paint (trade name "Ureall 600", manufactured by Kawakami Paint Mfg. Co., Ltd.) was coated thereon in an average film thickness of about $20\mu$.

The paint film obtained did not peel off in the cross cut test.

COMPARISON EXAMPLE 2

The same procedure as in Examples 2 to 6 were repeated except for using no rubber component material.

Each of the paint coatings obtained peeled off completely in the cross cut test.

EXAMPLE 7

87 kg of polypropylene homopolymer (melt flow index 12), 10 kg of styrene-butadiene rubber as was used in Example 2 and 3 kg of a vinyl copolymer containing as a comonomer a vinyl monomer having glycidyl group (trade name "Almatex 2220", manufactured by Mitsui Toatsu Chemicals, Inc.) were mixed by a tumbler and then melt kneaded in a continuous Banbury mixer at about 200° C. The melt discharged from the mixer was formed into a sheet shape, cooled and crushed to obtain a composition. The composition obtained was molded by injection molding to prepare a test piece having a size of $160 \times 80 \times 2$ mm. After abrading the surface of the three test pieces with an abrasive paper (JIS #400), each of an urethane paint (trade name "Uniace #70", manufactured by Cashew Co., Ltd.), a phenol paint (trade name "Cashew", manufactured by Cashew Co., Ltd.) and an alkyd paint (trade name "Carrot #3000", manufactured by Cashew Co., Ltd.) was coated on each of the test pieces to a dry thickness of about 20μ.

None of the paint films obtained peeled off when subjected to the cross cut test.

On the other hand, the above procedure was repeated except for using no styrene-butadiene rubber. Each of the paint films obtained easily peeled off in the cross cut test.

EXAMPLE 8

The same procedure as in Example 7 was repeated except for using a high density polyethylene (melt flow index 14).

Each of the paint films did not peel off in the cross cut test.

EXAMPLE 9

Polypropylene homopolymer (melt flow index 12), 1,2-polybutadiene as was used in Example 2 and calcium carbonate were supplied to a continuous Banbury mixer by means of a quantitative feeder at a feed ratio of 9:1:10 in weight ratio and melt kneaded at about 200° C. The melt discharged from the mixer was cooled and crushed to obtain a composition. The composition obtained was molded by injection molding to prepare a test piece as obtained in Example 7. During molding, 1,2-polybutadiene having a hydroxy group at its terminals as was used in Example 1 was supplied to the mixer by means of a liquid color feeder in a feeding ratio of 2 wt% based on the total weight of the polypropylene homopolymer, 1,2-polybutadiene and calcium carbonate. After abrading the surface of the test piece with an abrasive paper (JIS #400), an urethane paint (trade name "Uniace #70", manufactured by Cashew Co., Ltd.) was coated thereon in an average film thickness of about 20μ. The paint film did not peel off when it was subjected to the cross cut test.

On the other hand, the above procedure was repeated except for using 1,2-polybutadiene. The paint film easily peeled off when it was subjected to the cross cut test.

EXAMPLE 10

47 kg of polypropylene homopolymer (melt flow index 12), 2 kg of styrene-butadiene rubber as was used in Example 2, 1 kg of a partially saponified product of ethylene-vinyl acetate copolymer which was soluble in a solvent in an amount of 2.0 wt%, 25 kg of cellulocin as was used in Example 6 and 25 kg of calcium carbonate were weighed out, and the first three materials were premixed in a tumbler. The resulting mixture, the cellulocin and the calcium carbonate were supplied to a continuous Banbury mixer by means of a quantitative feeder at a feed ratio of 2:1:1 in weight ratio and melt kneaded at about 200° C. The melt discharged from the mixer was cooled and crushed to obtain a composition. The composition was molded by injection molding to prepare a test piece having a size of 160×80×2 mm. After abrading the surface of the test piece with an abrasive paper (JIS #400), an urethane paint (trade name "Ureall 600", manufactured by Kawakami Paint Mfg. Co., Ltd.) was coated thereon to a dry thickness of about 20μ.

The paint film did not peel off even when it was subjected to the cross cut test.

On the other hand, the above procedure was repeated except for using styrene-butadiene rubber. The paint film easily peeled off when it was subjected to the cross cut test.

EXAMPLE 11

A test piece was obtained in the same manner as in Example 7. After abrading the surface of the test piece with an abrasive paper (JIS #400), a 3 wt% toluene solution of a vinyl copolymer containing as a comonomer a vinyl monomer having a glycidyl group (the vinyl copolymer contained the same vinyl monomer having a glycidyl group as that present in the test piece; trade name "Almatex 2220", manufactured by Mitsui Toatsu Chemicals, Inc.) was coated in a dry film thickness of about 1μ thereon and dried under natural conditions at normal temperature. Thereafter, a phenol paint (trade name "Cashew", manufactured by Cashew Co., Ltd.) was coated thereon to a dry thickness of about 20μ. The paint film obtained was durable to the cross cut test after immersion in hot water at 80° C. for 30 minutes.

On the other hand, the paint film obtained in the same manner as mentioned above except that the vinyl copolymer solution was not applied or the vinyl copolymer was not blended therewith peeled off in the cross cut test after immersion in hot water at 80° C. for 30 minutes.

EXAMPLE 12

The same procedure as in Example 7 was repeated except for further blending, as a polymer having a functional group, 1.5 kg of a partially saponified product of an ethylene-vinyl acetate copolymer.

The addition of such a material did not have any adverse influence on the adhesiveness of the molding and the paint, and rather improved the adhesiveness between the molding and an urethane paint (trade name "Ureall 600", manufactured by Kawakami Paint Mfg. Co., Ltd.) as was used in Example 10, whereby the paint coating which was not durable to the immersion test in Example 11 became durable.

While the invention has been described in detail and with reference to specific embodiments thereof, it will be apparent to one skilled in the art that various changes and modification can be made therein without departing from the spirit and scope thereof.

What is claimed is:

1. A process for producing a polyolefin composition which comprises melt kneading
    (a) a polyolefin,
    (b) a rubber component incompatible with the polyolefin and
    (c) at least one polymer having a functional group and which is compatible with the rubber component and is soluble in a solvent in which the rubber component is soluble to obtain a polyolefin composition in which the rubber component containing the polymer having a functional group is dispersed in a granular form;

said polyolefin being selected from the group consisting of homopolymers, copolymers and mixtures thereof of an unsaturated monoolefin having 2 to 6 carbon atoms;

said rubber component being a thermoplastic uncured elastomer and selected from the group consisting of 1,4-polybutadiene, 1,2-polybutadiene, styrene-butadiene rubber and acryl ester rubber;

said polymer having a functional group being selected from the group consisting of a partially saponified product of an ethylene-vinyl acetate copolymer, an acrylic acid polymer, N-methylolpolyacrylamide, a condensation product of a dimer acid and a diamine, 1,2-polybutadiene having a functional group at the terminals thereof, 6-nylon-N-methoxymethylether, a vinyl copolymer containing as a comonomer a vinyl monomer having a glycidyl group, and a urethane prepolymer.

2. A polyolefin comprising (a) a polyolefin having dispersed therein particles of (b) a rubber component containing (c) a polymer having a functional group in its molecular structure;

said polyolefin being selected from the group consisting of homopolymers, copolymers and mixtures thereof of an unsaturated monoolefin having 2 to 6 carbon atoms;

said rubber component being a thermoplastic uncured elastomer compatible with said polymer having a functional group but incompatible with said polyolefin and being soluble in a solvent in which said polymer having a functional group is soluble, said rubber component being selected from the group consisting of 1,4-polybutadiene, 1,2-polybutadiene, styrene-butadiene rubber and acryl ester rubber;

said polymer having a functional group being selected from the group consisting of a partially saponified product of an ethylene-vinyl acetate copolymer, an acrylic acid polymer, N-methylol polyacrylamide, the condensation product of a dimer acid and a diamine, 1,2-polybutadiene having a functional group at the terminals thereof, a vinyl copolymer containing as a comonomer a vinyl monomer having a glycidyl group, 6-nylon-N-methoxymethylether and a urethane prepolymer.

3. The polyolefin composition of claim 2, wherein said unsaturated mono-olefin is selected from the group consisting of ethylene, propylene, butene and methylpentene.

4. The polyolefin composition of claim 2, wherein said polyolefin is polyethylene.

5. The polyolefin composition of claim 2, wherein said polyolefin is polypropylene.

6. The polyolefin composition of claim 2, wherein said functional group is selected from the group consisting of a hydroxy group, a carboxyl group, a glycidyl group, an amino group, an amide group, an imino group and an isocyanate group.

7. The polyolefin composition of claim 2, wherein the particle size of said rubber component is not larger than about $5\mu$.

8. The polyolefin composition of claim 6, wherein said functional groups are present as terminal groups or as groups pendant from the polymer main chain of said polymer containing functional groups.

9. The polyolefin composition of claim 8, wherein said functional groups are present in an amount of 1/100 mol per 100 parts by weight of the rubber component.

10. The polyolefin composition of claim 2, wherein the functional groups are present in said polymer containing a functional group and present in an amount of 1/100 parts by weight of the rubber component.

* * * * *